(12) United States Patent
Sirén

(10) Patent No.: US 6,763,236 B2
(45) Date of Patent: Jul. 13, 2004

(54) RESOURCE ALLOCATING AND SERVICE PROVIDING OVER A WIRELESS NETWORK

(75) Inventor: Ritva Sirén, Helsinki (FI)

(73) Assignee: Nokia Mobile Phones, Ltd., Espoo (FI)

(*) Notice: Subject to any disclaimer, the term of this patent is extended or adjusted under 35 U.S.C. 154(b) by 474 days.

(21) Appl. No.: 09/891,067

(22) Filed: Jun. 25, 2001

(65) Prior Publication Data

US 2002/0006801 A1 Jan. 17, 2002

(30) Foreign Application Priority Data

Jun. 30, 2000 (FI) .............................................. 20001574

(51) Int. Cl.[7] ................................................ H04Q 7/20
(52) U.S. Cl. ........................ 455/450; 455/452; 370/431; 370/437
(58) Field of Search ............................ 455/3.01, 552.1, 455/550.1, 452.1, 452.2; 370/328, 338, 401, 402, 351, 352, 353, 354, 355, 356, 432, 392

(56) References Cited

U.S. PATENT DOCUMENTS

| | | | |
|---|---|---|---|
| 5,966,659 A | 10/1999 | McDonald et al. | 455/445 |
| 6,144,673 A * | 11/2000 | Korus | 370/432 |
| 6,298,120 B1 * | 10/2001 | Civanlar et al. | 379/88.17 |
| 2003/0052905 A1 * | 3/2003 | Gordon et al. | 345/700 |

FOREIGN PATENT DOCUMENTS

| | | |
|---|---|---|
| EP | 0917380 A2 | 5/1999 |
| WO | WO 99/08457 | 2/1999 |
| WO | WO 99/16266 | 4/1999 |
| WO | WO 01/47301 A2 | 6/2001 |

OTHER PUBLICATIONS

"Scalable Delivery Of Web Pages Using Cyclic Best–Effort Multicast", Almeroth et al., INFOCOM '98, 17th Annual Joint Conference Of The IEEE Computer And Communications Societies.

* cited by examiner

Primary Examiner—Cong Van Tran
(74) Attorney, Agent, or Firm—Perman & Green, LLP (57) ABSTRACT

A method, network element, communication device and system of allocating resources and transmitting a service to several subscribers. The system comprises a server (Srv1, Srv2) for providing a service, a wireless network (AN1–AN3) for communicating said service in channels over an air interface, and terminals (MN1, MN2) of said wireless network for receiving the service in a channel over the air interface. The system comprises a first subset of the channels allocated to individual point-to-point user channels having a single terminal as recipient, and a second subset of the channels allocated to group channels being capable of having multiple terminals as recipients.

19 Claims, 5 Drawing Sheets

| PR0 | |
|---|---|
| Application | Delay(sec) |
| Entertainment video | 120 |
| File Download | 20 |
| News/text | 2 |
| News/video | 20 |
| ... | |

| PR1 | |
|---|---|
| Application | Delay(sec) |
| Entertainment video | 600 |
| File Download | 1800 |
| News/text | - |
| News/video | - |
| ... | |

| USP | |
|---|---|
| Application | Delay(sec) |
| - | - |
| File Download | 10 |
| - | - |
| - | - |
| ... | |

RESOURCE ALLOCATING AND SERVICE PROVIDING OVER A WIRELESS NETWORK

FIELD OF THE INVENTION

The invention relates to allocating channels of a wireless network and offering services to terminals of the wireless network. The invention relates especially to utilising group transmissions in a wireless network. The invention is suited especially, but not limited to, for wireless networks with a limited bandwidth for multicast transmissions.

BACKGROUND OF THE INVENTION

A problem underlying the invention is that in wireless networks, such as in mobile telephone networks, the overall bandwidth is limited and usually reserved by one single mobile terminal per channel, and altogether the number of channels in the network is limited. Also, at the moment services, such as phone calls or data calls over a mobile telephone network, are rather expensive. One improvement is a so called packet radio network, such as GPRS (General Packet Radio Service) which uses packet transmission, where channels are reserved dynamically whereby the channel is reserved by a certain mobile telephone only when there is something to transmit. However, for certain high load services this is still not a solution. In future there is a need to provide more and more services to a mobile terminal. Certain such services are real-time services, such as radio and television broadcasts, in which information is transmitted continously without pauses and to use a mobile network for such transmissions, even with packet radio, would end up being very expensive for the subscriber. This is due to the fact that the mobile network has been designed for point-to-point services and transmissions. Thus a user would not be very likely to use services, such as receiving a radio or TV broadcast, over a mobile telephone network. And mobile network bandwidth would not easily accommodate a significant number of such users.

BRIEF SUMMARY OF THE INVENTION

Accordingly, it is an object of the present invention to provide a mechanism for allocating channels of a wireless network for transmitting services to different subscribers, i.e. terminals of the wireless network.

According to a first aspect of the invention there is provided a method for offering services to subscriber terminals of a wireless communication network, the method being characterized in that it comprises allowing the users of the subscriber terminals to select between a first service to be transmitted as a point-to-point individual transmission to the subscriber terminal over the wireless network and a second service to be transmitted as group transmission to the subscriber terminal over the wireless network.

According to a second aspect of the invention there is provided a method of allocating channels of a wireless network, the method being characterized in that it comprises allocating a first subset of the channels to individual point-to-point user channels having a single recipient, and allocating a second subset of the channels to group channels being capable of having multiple recipients.

According to a third aspect of the invention there is provided a network element for assisting allocation and transmission of a service from a server to at least two subscribers in a network, the network element being characterized in that it comprises:

means for keeping information on available services, means for receiving requests from subscriber terminals of a wireless network for one of said available services, means for configuring transmission of the service over one of a group transmission and an individual point-to-point transmissions, the transmission mode being dependent on at least one of the particular service requested and information on preferred transmission mode in the request transmitted by the subscriber terminal.

According to a fourth aspect of the invention there is provided a communication device for receiving an allocated service via a wireless network having a number of channels for communication over the air interface, the communication device being characterized in that it comprises:

means for selecting between a first service to be transmitted as a point-to-point individual transmission to the subscriber terminal over the wireless network and a second service to be transmitted as group transmission to the subscriber terminal over the wireless network, and a transceiver for sending a request to receive one of the first and second service as a response to a performed selection.

According to a fifth aspect of the invention there is provided a system comprising a server for providing a service, a wireless network for communicating said service in channels over an air interface, and terminals of said wireless network for receiving the service in a channel over the air interface, the system being characterized in that it comprises a first subset of the channels allocated to individual point-to-point user channels having a single terminal as recipient, and a second subset of the channels allocated to group channels being capable of having multiple terminals as recipients.

The invention deals with how the total transmission bandwidth is allocated between different purposes when transmitting services via networks. In one embodiment of the invention subscribers transmit requests to service providers including information on what kind of services they want to use, and the requests also contain information about on how the requested service is to be transmitted to the subscribers. The service can be transmitted as a group transmission or as one or more individual (point-to-point) transmissions. With 'individual' or 'point-to-point' transmission is meant that each data packet is dedicated to only one mobile node, such as mobile phone. 'Group transmission', as used herein, is a generic term for techniques in which data packets are intended to a group comprising two or more subscribers. Broadcasting and multicasting are common examples of group transmissions.

One purpose of the invention is to allow service offering of real time radio or TV braodcasts in a cost effective way, which lowers per subscriber cost while still maintaining or even increasing the revenue level of the operator. In this use a subscriber joins an existing group, where group formation usually happens at the source of the transmission.

In a further embodiment of the invention, group transmission is used to decrease the network capacity usage (and thus to increase network capacity) of large content file downloads by offering the download in predefined intervals for subscribers who have requested the service during the same period. In this case the acceptance by the subscriber of joining a group transmission may cause some delays. Namely, it is highly unlikely that a large group of subscribers will request a service simultaneously. This means that for certain type of services, group formation will involve delays, whereas for other services (such as radio broadcast) there is no delay, but a subscriber will be joined to the service immediately. Some applications and some subscribers tolerate longer delays than others. The subscribers should be able to indicate that they are willing to join a group if joining the group causes a certain maximum delay and/or allows a certain minimum price deduction over point-to-point transmission.

According to a preferred embodiment of the invention, this problem (delays and price issued versus subscriber preferences) is solved by requests sent by subscribers or evaluating subscription profiles which indicate on what terms each mobile node subscriber is willing to suffer additional delays. The contents of the profiles differ between different application types. For example, a file download may, in some situations, tolerate delays up to some hours. In contrast, an investor may not be willing to wait more than a few seconds for an important piece of news. Thus, the network operator or server administrator may set up network-wide or server-wide default profiles which indicate the maximum allowable delay for each application type. The profiles may also differ between different subscribers. The subscriber-specific profiles override the network-wide or server-wide default profiles. Yet further, a subscriber should be able to indicate if a certain situation requires a deviation from the subscriber-specific profile, which in turn indicates a deviation from the network-wide or server-wide default profiles. Such a temporary deviation can be indicated by including a corresponding parameter in the actual service request.

Subscribers inform the service providers by various requests. The requests comprise information about the requested information and information about a preferred transmission mode. In addition to the information requests, the history of the service popularity and/or the type of the service can be taken into account in e.g. when and for how many subscribers a group is formed. For example, for some service types, a group can be formed for a single subscriber, and more subscribers can be added to the group later. An example of such a service is file download, if the download protocol allows the download to begin at an arbitrary position of the file. Another example is real-time video wherein the subscriber wants to see what is happening now, instead of requesting transmission from the beginning of the program. (Some video sources do not even have a 'beginning'. For example, ski resorts or golf courses may offer real-time video of the current weather conditions.) With such services, if the history shows that the service has been popular, a group may be formed although it initially comprises only one subscriber. Some basic services, such as authority information, can be always transmitted to subscribers independently of the requested services or allocated resources. Thus, the system reserves a minimum resource being capable of transmitting the authority information at the request.

The air interface capacity is limited. The bandwidth usage may be divided in different priorities. Therefore the service provided to the users can be delayed or even cancelled, e.g. if the service needed is not so important and the user would not pay so much about the service, especially if the bandwidth is limited by usage for important connections. Service may also be cancelled in a roaming situation where the terminal device moves under an adjacent transmitter, such as an adjacent base station, and that transmitter does not have enough free capacity for this purpose. Basically in business sense there may be two different kind of services: point-to-point and point-to-multicast. The point-to-point is normal individual usage of bandwidth, like when having connection to the phone calls, and usually the user cannot influence to the costs. The point-to-multicast transmission can be divided into the different categories depending what kind of services the user is interested in.

There are two different cases of group forming: 1) The traditional case of broadcasting applications, e.g. TV or radio, where a transceiver is joined to a real-time multicast transmission as soon as the request arrives. 2) The service is e.g. retrieval of a file type copy such as an individual audio or video file, whereby a multicast group can be formed based on timeslots of arriving requests.

BRIEF DESCRIPTION OF THE DRAWINGS

The method and the apparatus according to the invention will be described more in detail by means of preferred embodiments, with reference to the appended drawings in which.

DETAILED DESCRIPTION OF THE INVENTION

Figure 1:
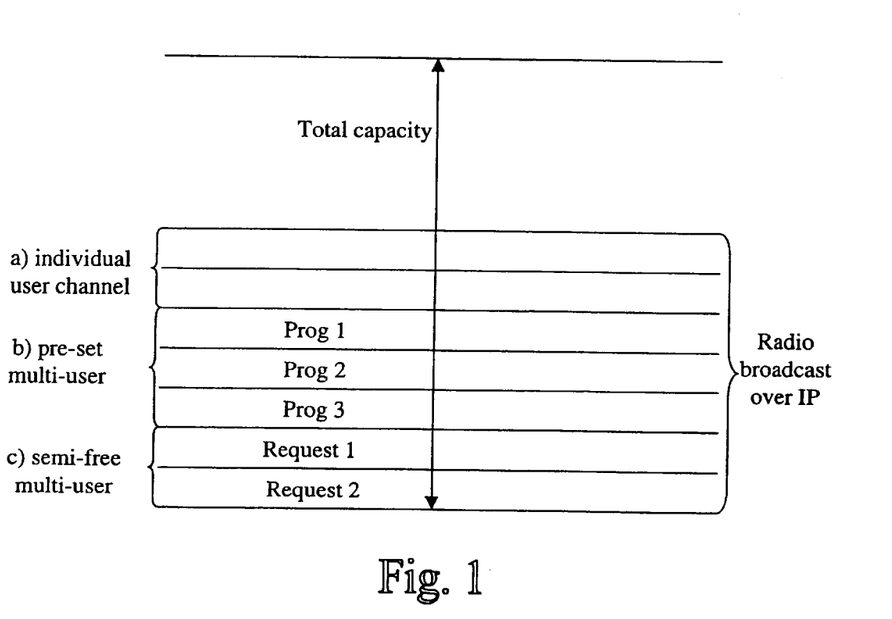
FIG. 1 illustrates allocation of the bandwidth according to the invention.

FIG. 1 illustrates the allocation of the bandwidth of one wireless access network according to the invention. Concerning cellular telephone network the bandwidth that can be used is the different bandwidths of the different base stations of the network. Each base station has certain channels that it can use and that can vary from the channels used by other base stations of the network. A total capacity or a portion of the total capacity of the used wireless access network or combination of different networks is divided for example to a) individual user channels that can be point-to point user channels (for e.g. making a bank payment over a wirelss channel), i.e. they are reserved for point-to-point communication, b) pre-set multi-user channels that have group transmission capability, i.e. they are reserved for certain group transmissions, which are predefined regarding what group transmission service will be sent, and c) semi-free multi-user channels, where the first user can select a service to get over such a channel, and other users can join in to the service whereby a group is formed and the service is provided as a group transmission. In the simplified example of FIG. 1 there are two a) channels, three b) channels and two c) channels. FIG. 1 Prog 1–3 illustrate fixed or predefined services transmitted to the mobile nodes by radio over e.g. Internet Protocol (IP). References Request 1 and Request 2 illustrate the fact that mobile nodes send a request to the service provider for ordering a freely desired (but available) service over one of the semi-free multi-user channels where others can later join in.

FIG. 1 illustrates that there is defined a subset of total bandwidth for services a), b) and c), such as high load applications, and the other channels of the total capacity may be used for regular traffic that the network is intended for, e.g. for normal voice calls in a mobile telephone network. This total allocated bandwidth is divided to virtual channels based on the bandwidth requirement of an application for one session flow. The number of channels can be derived by dividing the total allocated bandwidth by the bandwidth of one channel. For example, the total allocated bandwidth for a specific application can be described by the symbol H. The number of channels is N and the bandwidth of one channel is B. Now the number of channels can be derived from the following, N=H/B.

In some instances the bandwidth per channel may vary. This has to be taken into account when the total number of available virtual channels is estimated. For example, the total allowed resources can not be exceeded.

From the total number of channels a subset can be allocated for individual point-to-point user channels (a) (FIG. 1). Also from the total number of channels a subset can be allocated for group channels where one channel can have multiple recipients and which have a predetermined flow of content (b) (FIG. 1), such as program flows. This could be radio and TV programs for example. It is also possible that from the total number of channels a subset is allocated for semi-free group channels, where mobile nodes have a free choice from wide, even world wide, selection of flows as long as there are free channels (c) within this subset (FIG. 1). This could be for example a download of a MP3 music file, where during a delay a group is formed and the file is transmitted to several terminals as a group transmission. Also in an example all channels a), b) and c) could be used for radio broadcasts transmitted over IP (Internet Protocol), as indicated in FIG. 1. Thereby certain channels would be fixed for certain radio broadcasts (b), whereas others would be of free choice and individually for one user only (a), or for a group of users the first one making the choice (c).

Regarding the b) and c) channels, if a request for a service is received at a service-providing server, which already has a service on, the requesting mobile node is joined in this existing group to use the service. If a request for a service is received at a service-providing server, which does not have a corresponding service to the request, but there are free channels available, the service providing server searches the multicast chain upward to find the service. If the service is found the delivery is started. In case of the semi-free selection group other subscribers can later join to follow this transmission. If a request for a service is received, and there are no channels available the mobile node is informed that the requested service can not be delivered, because there are no available resources. In this case, the requesting mobile node can also receive information on what services are currently in delivery so that the mobile node can join one of them.

From the above, the total number of virtual channels allocated is therefore the sum of the three shown in FIG. 1 (N=a+b+c). Of course, if there are more channels/transmissions, the total number is again the sum of the channels/transmissions.

Various services are priced based on how the choices of services are delivered to a mobile node. Individual transmission is more expensive, because the resources of the channel are reserved for individual use. The same service transmitted by/via group transmission is priced less expensive to the mobile node, because the resource is now divided by multiple users. An indication from the request is stored in the group forming unit (GFU) or in the server (Srv) for billing the subscriber that will be described in connection with FIG. 2. By pricing such channels less expensive that use group transmission than individual transmissions certain service such as radio or TV broadcasting over a cellular channel will become more attractive. Also service providers and network operators may still be making more profit since the same channel is sold to several subscribers. Let us assume that a certained pre-set multi-user service is priced one fifth of the price of e.g. a voice call in a cellular network. However, if ten users access this service simultaneously, it means that the network operator is getting double price of a single channel used for individual transmission. Thus if the operator can attract ten users to a particular service with the cheaper price compared with that the normal one channel price would attract only one user, then the operator would profit more by offering these group channels. By offering a pre-set selection of programs cheaper, the service provider can attract more users and still keep them satisfied. For example the b) channels could thus have a cheapest price, and c) a bit more, but less than a) channels. Thus the allocation of network bandwidth according to the present invention provides advantages to the user in cheaper services and at the same time more profits to the network operators. Also, at the same time network capacity is perceived to increase as more subscribers can be served simultaneously.

In a further embodiment of the invention some basic services, such as authority information, can be always allowed to be transmitted to subscribers independently of the requested services or allocated resources. A basic service capacity requirement has a priority over service-related transmitting. If the network is heavily loaded and for some reason there is a need for transmitting basic services, the requested services can be decreased by the GFU in such a way that there exists enough bandwidth for transmitting the needed basic service.

Figure 2:
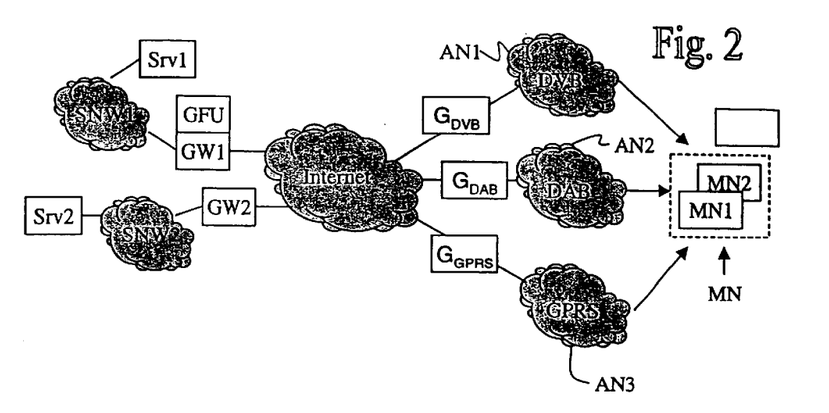
FIG. 2 depicts a block diagram of a network arrangement in which the invention can be used.

FIG. 2 is a block diagram of a network arrangement in which the invention can be used. Mobile nodes MN1, MN2 request services from one or more servers Srv1, Srv2. The mobile nodes can access the services via several alternative wireless access networks AN1, AN2, AN3. In the example shown in FIG. 2, the access networks comprise a network AN1 enabling digital video broadcasting (DVB), a network AN2 enabling digital audio broadcasting (DAB) and a network AN3 enabling general packet radio service (GPRS). Other typical access networks, especially mobile phone networks such as GPRS, are GSM high speed circuit switched data (HSCSD), wideband-CDMA (Code Division Multiple Access), EDGE (Enhanced Data GSM Environment), CDMA2000, or any other equivalent 3G-network ($3^{rd}$ Generation) solution. Also an example of a wireless access network is a WLAN (Wireless Local Area Network). In an access network using wireless transmission the total capacity is limited by allocated frequency bandwidth. In this example, the servers Srv1 and Srv2 are connected to their service networks SNW1 and SNW2, which may be a service provider's local area networks, for example. It is generally known that in mobile communication networks, the air interface resources are very limited and the bandwidth typically very narrow, whereas broadcast networks like DAB and DVB have a wider bandwidth.

However, also DAB and DVB have besides the broadcasting a data service capability with e.g. a 20 Mbyte/s bandwidth. This is wide compared to cellular phone networks but is not sufficient for group transmissions of very large groups and still far less than available offered services would use (e.g. over fixed Internet connection or regular TV broadcasting). The service network SNW1, SNW2 is connected to the Internet via a gateway GW1, GW2 (and, typically, via a firewall which is not shown separately). The access networks AN1, AN2, AN3 are connected to the Internet via corresponding gateways $G_{DVB}$, $G_{DAB}$, $G_{GPRS}$.

The invention can be used in a network arrangement with multiple alternative wireless access networks for transferring services located at a server to a wireless subscriber device, as shown in FIG. 2. However, the invention is applicable to a network arrangement with only one access network, such as the GPRS network, as long as the access network is capable of individual (point-to-point) and group transmissions. In publication WO99/08457 there is a description of a solution for point-to-multipoint transmissions in GPRS.

The service network SNW1, SNW2 comprises or is functionally connected to a group formation unit GFU. The group formation unit collects or monitors service requests from the mobile node subscribers MN1, MN2. It evaluates the information of the service requests. If the information has an indication to join to group, the GFU forms a group of the subscribers that have requested the service and transmits (or allows/controls the transmission of) the service over a group transmission. If the request information has an indication that the preferred transmission mode is individual, the GFU transmits (or allows/controls the transmission of) the service over a sufficient number of individual transmissions as long as there is allocated bandwidth available. In the example shown in FIG. 2, the group formation unit GFU is integrated or co-located with the gateway GW1. In this case, if the criteria for group formation are met, the GFU requests the gateway to associate the group members with the group. It also requests the appropriate service-providing server Srv1 to send the service to the gateway GW1 such that the destination field of the data packets indicates the group as the recipient.

The capacity control of the access network, and thus the allocation of channels are performed at the base station controller (BSC) in case of a mobile phone network. Capacity control can also be performed by the group forming unit GFU if it is located within the access network and being in connection e.g. with the BSC or base station BS. In case of a multicast transmission, the server would already send the service as a multicast transmission, which is then delivered to the subscribers over the access network.

Figure 3:
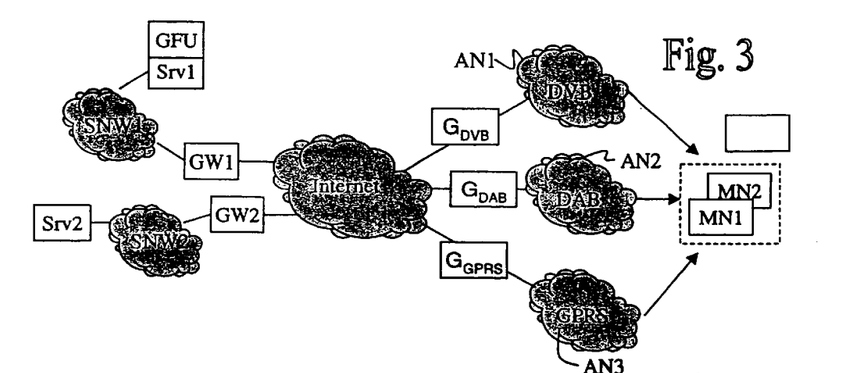
FIG. 3 shows an alternative location for the group formation unit as compared to FIG. 1.

FIG. 3 depicts a modified example of FIG. 2 in which the group formation unit GFU is integrated or co-located with a service-providing server SRV1. In this case, if the criteria for group formation are met, the GFU/Srv1 combination applies source routing to the corresponding destination. In other words, if subscribers in the DAB network generate requests that indicate group transmission, the GFU/Srv1 combination directly transmits the service to the gateway $G_{DAB}$ that forwards the service as a group (for example multicast) transmission.

In addition to the placement in FIG. 2 and 3 the group formation unit GFU may be located elsewhere in the network, e.g. in an access network AN1–AN3 or in connection with the gateways $G_{DAB}$, $G_{DVB}$, $G_{GPRS}$.

Figure 4:
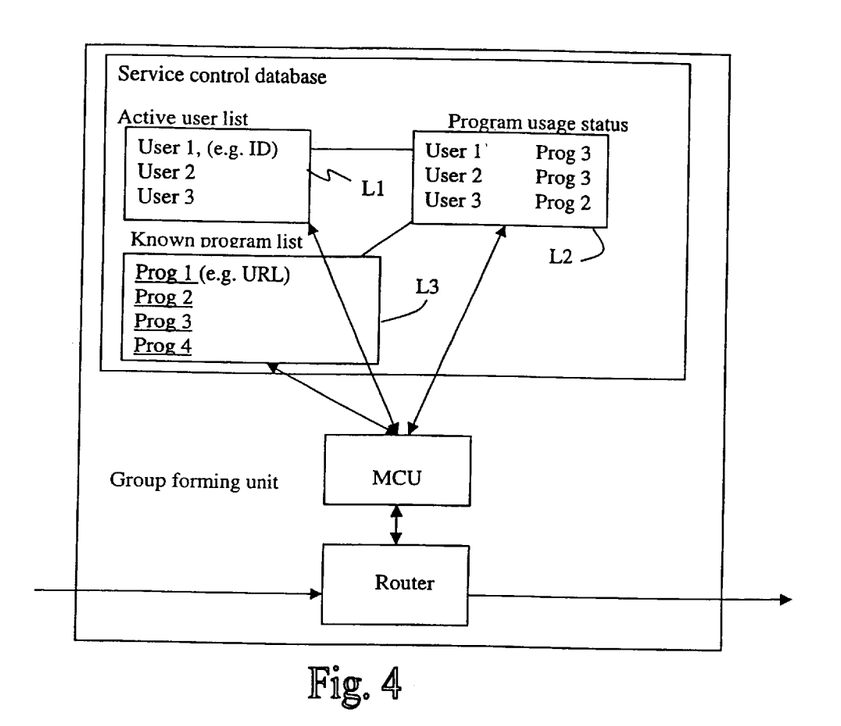
FIG. 4 illustrates a block diagram of the groupr formation unit.

FIG. 4 shows a Group Forming Unit GFU, which preferably comprises a router and a database for performing group transmission control. The router is preferably a multicast router capable of routing multicast transmissions, i.e. transmissions to multiple users simultaneously. The database comprises an active user list L1, a program usage status list L2 and a known program list L3. The active user list L1 includes a list of those subscribers that are using a service via the GFU at the moment and the list L1 will have a pointer to the subscriber information database that is located e.g. in the HLR (Home Location Register). The program usage status list L2 keeps information on which service/program each active user is using. The known program list L3 has connection capability to the Internet, and keeps an updatable list of available services.

Figure 5A:
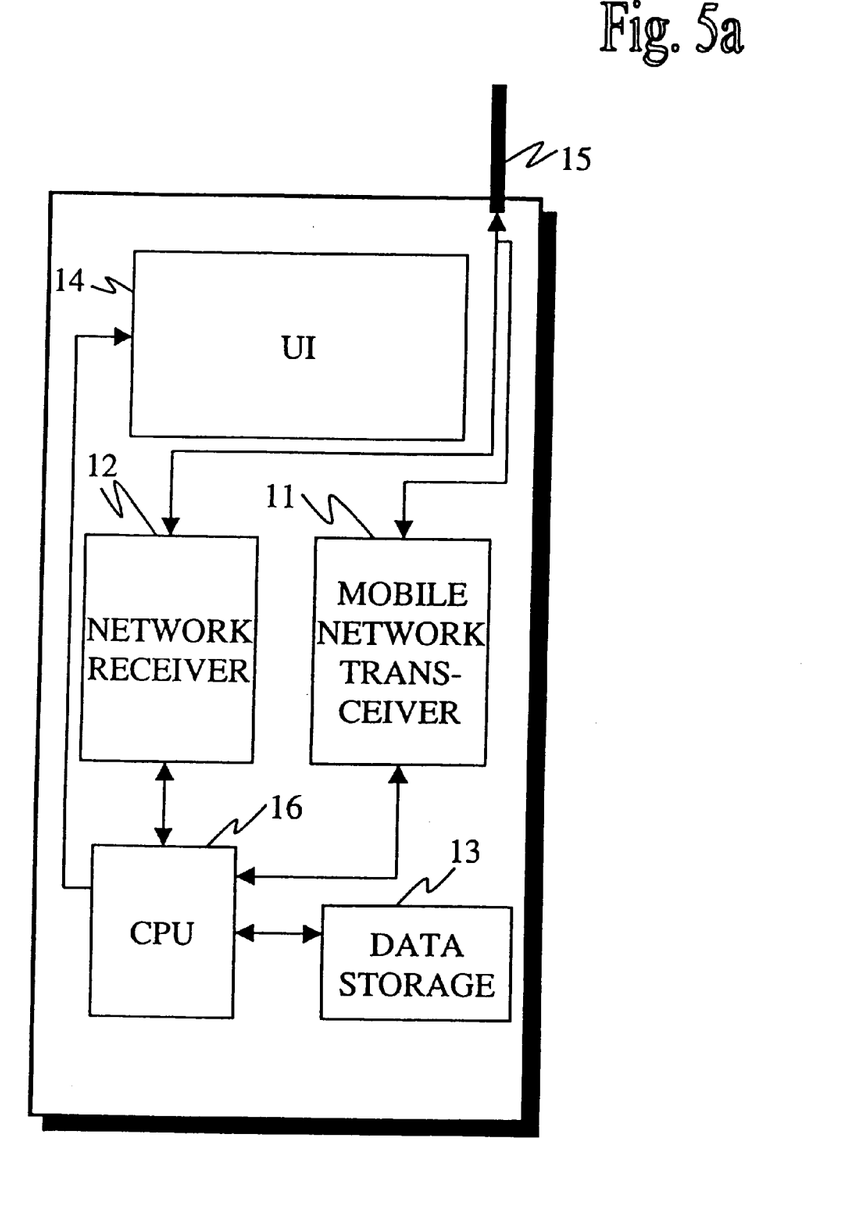
FIG. 5a depicts a block diagram of a subscriber terminal in which the invention can be used.

FIG. 5a depicts a block diagram of a subscriber terminal 10 in which the invention is used. The subscriber terminal is the mobile node in the network architecture. The mobile node can be a mobile phone capable of packet data communication, for example GPRS or 3G compatible. A mobile network transceiver 11 is used for this purpose. The terminal has also a network receiver 12 used to receive broadcast or multicast data, such as DVB or DAB data. A data storage 13 can be a memory unit, for example a flash memory or RAM, hard disk drive and it is used for storing the received data for example, a received data file. An output to be sent from the terminal 10 can be a visible information (such as text, picture or video), audio information (such as sound or voice) or data to be re-transmitted, and is sent by mobile transceiver 11 and antenna 15 to the network. An input coming to the terminal from the network can be received data, such as text, picture, video or audio information and is put to the user via user interface 14. The antenna element 15 can be a duplex mode antenna capable of at least two-frequency operation. The antenna element 15 can also have several antennas within the terminal each operating for the specific network. The operation and timing of all blocks of the terminal 10 is controlled by a central processing unit 16 such as a microprocessor. The different user profile information is stored in the data storage 13 and can be input by the user via user interface 14 comprising e.g. keypad, display, speaker and microphone.

Figure 5B:
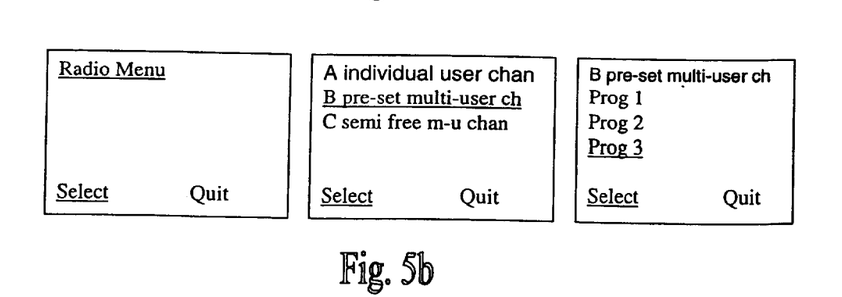
FIG. 5b shows different views on a display of subscriber terminal in using services according to the present invention.

FIG. 5b shows different views on a display of subscriber terminal in using services according to the present invention. In the first view on the left of the Figure there is shown a menu for the services, here called Radio Menu to reflect the example in FIG. 1 where the services would be radio broadcasts, although they can be other services as well as has been described. The menu commands Select and Quit on the lower side of the display can be selected by menu selection keys located below the display as is known from several mobile phones manufactured by Nokia. By choosing Select the second view shown in the middle in FIG. 5b will be displayed. This includes a list of the different types of services that can be selected by the user. As described earlier these different types of services can be A) individual user channels that can be point-to point user channels which the user can use to access individually any service but that is prices rather expensive, B) pre-set multi-user channels that have group transmission capability where one channel can have multiple recipients and which have a predetermined flow of content such as program flows (and would be priced rather low compared to A), and C) semi-free multi-user channels where mobile nodes have a free choice from wide, even world wide, selection of flows as long as there are free channels within this subset. The C) channels allow a free selection of service but also allow other subscribers to join in to access the same service.

Let us assume that the user selects B) pre-set multi-user channels whereby the third view shown at the right-hand side in FIG. 5b will be displayed to the user, which shows the different predetermined multi-user services that are available. Now the user would use arrow keys to indicate the desired program/service and the request for the service would be sent by pressing Select with the selection button.

Figure 6:
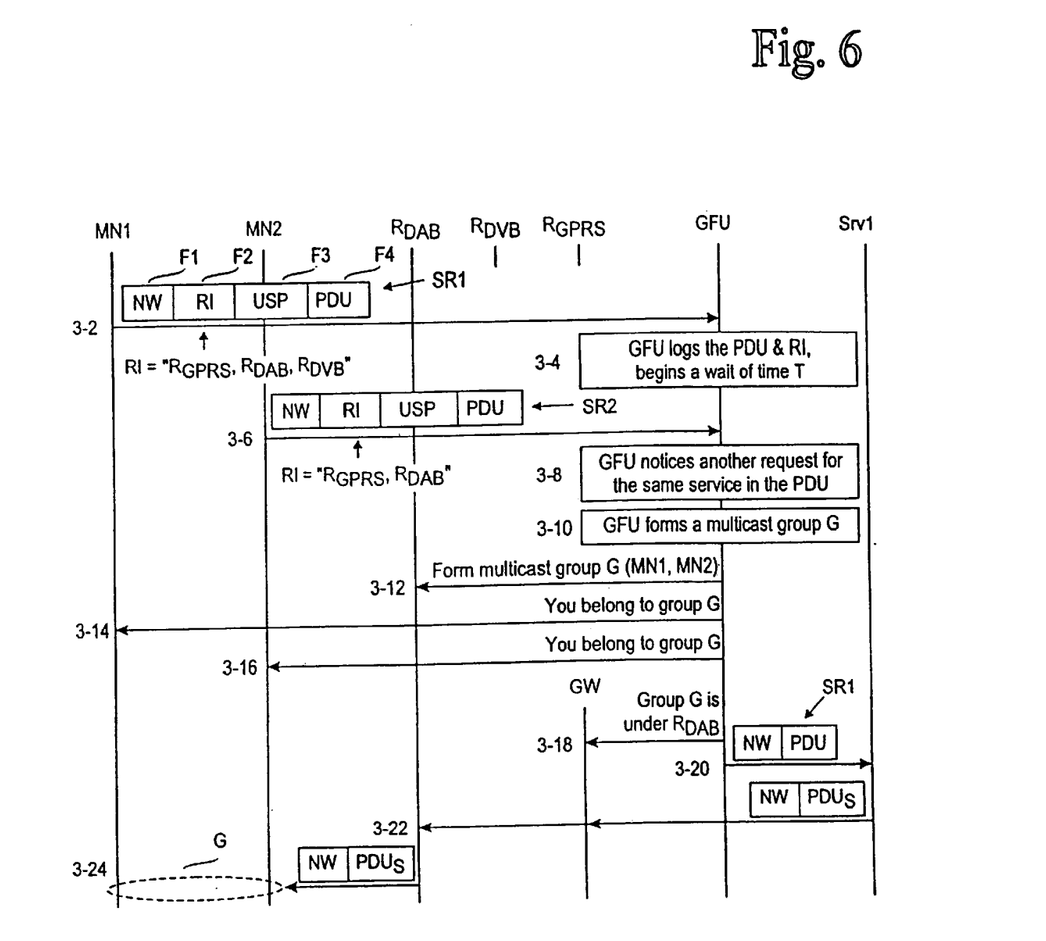
FIG. 6 shows a signalling diagram which relates to group forming.

FIG. 6 shows a signalling diagram, which relates to group forming in a network arrangement according to FIG. 2 and 3. In step 3-2, mobile node MN1 sends a service request SR1 comprising (for the purposes of this example) four fields F1 to F4. The F1 field is a network layer header indicating the sender and the destination of the service request, and the encapsulation protocol used, and a priority level for indicating basic and other services. The F2 field comprises available gateway/router information (RI). It indicates which gateways (or access networks) can be used to deliver the requested service. The F3 field is, or indicates, a user service profile USP, which will be discussed in more detail in connection to FIG. 7. The F4 field of the service request comprises the packet data units PDU which indicate which service is being requested, such as the delivery of a certain file or an audio stream, and an indication on what transmission mode (group or individual transmission) the user prefers, i.e. the preferred way of transmission. In the scenario shown in FIG. 6, it has been assumed that the service request SR1 from mobile node MN1 is the first pending request for a given service of server Srv1. The mobile node MN1 sends the service request SR1 to server Srv1 but the group formation unit GFU temporarily keeps the service request SR1 to itself. The service request SR1 indicates that MN1 can be accessed via gateways $G_{GPRS}$ and $G_{DAB}$ and $G_{DVB}$.

In step 3-4, the group formation unit GFU logs the service request and the available gateway information RI. In step 3-6 mobile node MN2 requests the same service by sending a service request SR2. The request SR2 differs from the request SR1 in that SR2 indicates MN2 as the sender and only $G_{GPRS}$ and $G_{DAB}$ as available routers. (The user service profiles USP may differ, but it does not matter for this scenario.) In step 3-8, the GFU notices another request for the same service. Let us further assume (for keeping FIG. 3 simple) that there are no more requests. Thus in step 3-10, the GFU forms a multicast group G in its own memory. The group G uses gateway $G_{DAB}$ because the access network under this gateway offers the preferred transmission among access networks which are common to both group members MN1 and MN2. In step 3-12, because $G_{DAB}$ has been selected as the preferred common gateway, the GFU orders gateway $G_{DAB}$ to configure its routing tables such that a new group G consists of mobile nodes MN1 and MN2. In steps 3-14 and 3-16, the GFU informs MN1 and MN2, respectively, that they are members of the group G in the DAB network. The messages 3-14 and 3-16 include the necessary security-related data, such as the necessary decryption keys (if needed).

In step 3-18, when the group G is formed, the GFU requests the gateway router GW to associate the group G with gateway $G_{DAB}$. Next, in step 3-20, the GFU forwards a service request SR to the server Srv1. This service request naturally requests the service which was requested by both MN1 and MN2. In step 3-22, the server Srv1 responds by starting to send packet data units $PDU_S$ to the gateway GW, which forwards them to the gateway $G_{DAB}$. Finally, in step 3-24, the gateway $G_{DAB}$ transmits packet data units $PDU_S$ of the requested service as one group transmission to the group G.

The GFU gets knowledge of different services and of which services or service types allow new members to be added to an existing group by mechanisms defined in known multicast protocols looking upwards in the network (e.g. in Internet) what services are available. Also some mechanisms allow to look downwards in the network.

Figure 7:
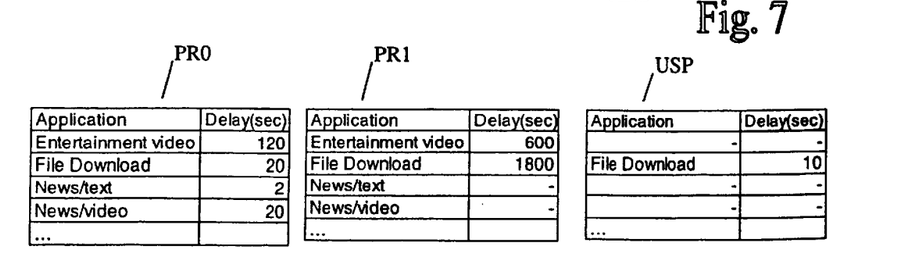
FIG. 7 illustrates the concept of service profile hierarchy.

FIG. 7 illustrates the concept according to a further embodiment of allowing certain delays in accessing certain group transmission services by disclosing service profiles setting out allowed delays. The network operator or the GFU administrator can set up a network-wide or server-wide default service profile PR0 which indicates the maximum allowable delay (in seconds) for several application types, four of which are shown in FIG. 7. Subscriber-specific service profiles PR1, . . . , relate to the subscribers of the mobile nodes MN1, MN2, etc. In this example, the subscriber-specific service profile PR1 does not have an entry for news/text or news/video, which means that the subscriber is satisfied with the corresponding default values of the default profile PR0. However, this subscriber is willing to tolerate longer delays in the hope of obtaining lower transmission costs, as indicated by the long maximum delay times for entertainment video and file download. Let us further assume that FIG. 7 shows an extraordinary situation in which the subscriber cannot tolerate the half-hour delay (1800 sec.) indicated by the profile PR1, and the user service profile USP sent along with the service request SR1 (cf. step 3-2 and field F3 in FIG. 6) indicates a maximum delay of 10 seconds. Thus the logic for the GFU is to use the rightmost profile which has an entry for the application type in question.

Moreover, some services are possible only in certain access networks. For example, the GPRS network is not well suited for transmitting live video streams. Thus, the default service profile PR0 (or some other data structure) should indicate which access networks are capable of conveying the service in question.

The profiles PR0, PR1, and USP shown in FIG. 7 are very simplistic in that the only indicated parameter is the maximum allowable delay until the beginning of group transmission. In practice, the profiles can have many more parameters, such as maximum allowable price per minute and/or minimum price deduction, which must be achieved in order to use group transmission. Thus, the network operator, or the service provider or the GFU administrator faces yet another problem: how to optimize group formation? If the demand for service requests are high, and many groups are formed in the broadcast networks, the broadcast networks may run out of resources. There is at least one approach to this problem.

Resource re-allocation can mean that the resources available to the network operator(s) are not fixed. In other words, the network operator(s) may adjust the resources allocated to the various access networks. In practice this means that at least two different access networks are owned or administered by a single operator (or several operators in cooperation), and that the one or more operators are able to adjust the bandwidth allocated to the access networks as needed. If several operators are involved, one of them can sell surplus capacity to another. This obviously requires that if one access network surrenders a certain frequency band, another access network is able to utilize that band.

The description only illustrates preferred embodiments of the invention. The invention is not, however, limited to these examples but it may vary within the scope of the appended claims. For example, a group may be formed on the basis of an estimate (an educated guess) that the service will be popular. Thus, for example, news can be broadcast at a certain time without actually measuring the requests of the service.

What is claimed is:

1. A method for allocating channels of a wireless network, the method comprising:
   allocating a first subset of the channels to individual point-to-point user channels having a single recipient,
   allocating a second subset of the channels to group channels being capable of having multiple recipients, the second subset of channels being allocated to a predetermined set of services, and allocating a third subset of the channels to group channels being capable of having multiple recipients, the third subset of channels being for any available service, the service being freely selectable by the user until all channels of the third subset of channels are reserved by at least one user, the third subset of channels allowing other users to join to the service.

2. A method according to claim 1, wherein a recipient having a subscriber terminal is allowed to select between a first service to be transmitted via at least one channel of the first subset of the channels to the subscriber terminal over the wireless network, a second service to be transmitted via at least one channel of the second subset of the channels to the subscriber terminal over the wireless network, and a third service to be transmitted via at least one channel of the third subset of the channels to the subscriber terminal over the wireless network.

3. A method according to claim 2, wherein the first service has a certain first price, the second service has a certain second price, and the third service has a certain third price.

4. A method according to claim 1, wherein at least one of the first, second and third subset of the channels is allocated to services located at a server coupled with the Internet.

5. A method according to claim 3, wherein the services are data services.

6. A method according to claim 2, wherein the first service is any service of the user's free choice that is available.

7. A method according to claim 2, wherein at least one of the first, second and third service is provided to the wireless network over a data network.

8. A method according to claim 2, wherein the recipient is allowed to select the service by allowing the subscriber terminal to transmit a request for a one of the services.

9. A method according to claim 2, wherein the recipient is allowed to select the service on a display of the subscriber terminal by displaying the first service as a first selectable item, the second service as a second selectable item, and the third service as a third selectable item.

10. A method according to claim 8, wherein the method further comprises upon receiving requests for a service from different recipients;

forming a subscriber group for a requested service;

transmitting the service to the recipients of the formed subscriber group in a channel defined to the group for the service;

receiving service to a subscriber terminal in a channel defined to the group.

11. A method according to claim 1, wherein the network comprises or is connected to several different wireless networks, and the service is transmitted over the group transmission in such a way that a network for the transmission is selected from the several different access networks.

12. A method according to claim 1, wherein the wireless network comprises broadcast networks, such as DAB or DVB, and mobile communication networks with point-to-point transmission capability, such as GSM, GPRS, or UMTS.).

13. A method according to claim 10, wherein the group forming comprises evaluating a subscription profile for each recipient that has requested the service.

14. A network element for assisting allocation and transmission of a service from a server to at least two subscribers in a network, the network element comprising:

means for keeping information on available services, means for receiving requests from subscriber terminals of a wireless network for one of the available services, and means for configuring transmission of the service over one of a first group transmission allocated to a predetermined set of services, a second group transmission allocated to any of the available services, the service being freely selectable by the user until all channels of the second group transmission are reserved by at least one user, the second group transmission allowing other user to join to the service, and an individual point-to-point transmission, the transmission mode being dependent on at least one of the particular service requested and information on preferred transmission mode in the request transmitted by the subscriber terminal.

15. A network element according to claim 14, wherein the network comprises or is connected to several different wireless access networks, and the network element is adapted to select a wireless access network out of a plurality of available wireless access networks.

16. A network element according to claim 14, wherein the network element is integrated or co-located with a gateway connecting a first network, to which the server is connected and a second network which is common to the wireless access networks.

17. A network element according to claim 14, wherein the network element is integrated or co-located with a server which provides the requested service.

18. A communication device for receiving an allocated service via a wireless network having a number of channels for communication over an air interface, the device comprising:

means for selecting between a first service to be transmitted as a point-to-point individual transmission to the communication device over the wireless network, a second service to be transmitted as group transmission to the communication device over the wireless network, the second service allocated to a predetermined set of services, and a third service to be transmitted as group transmission to the communication device over the wireless network, the third service allocated to any available service, the any available service being freely selectable by a user until all channels allocated to the third group transmission are reserved by at least one user, the group transmission allowing other users to join to the service, and a transceiver for sending a request to receive one of the first, second, and third service as a response to a performed selection.

19. A system comprising a server for providing a service, a wireless network for communicating the service in channels over an air interface, and terminals of the wireless network for receiving the service in a channel over the air interface, the system comprising:

a first subset of the channels adapted to be allocated to individual point-to-point user channels having a single terminal as recipient, and a second subset of the channels adapted to be allocated to group channels being capable of having multiple terminals as recipients, the second subset of channels being allocated to a predetermined set of services, and a third subset of the channels adapted to be allocated to group channels being capable of having multiple terminals as recipients, the third subset of channels being for any available service, the service being freely selectable by the user until all channels of the third subset of channels are reserved by at least one user, the third subset allowing other users to join to the service.

* * * * *